United States Patent
Lee et al.

(10) Patent No.: US 10,215,463 B2
(45) Date of Patent: Feb. 26, 2019

(54) MONITORING SYSTEM WITH CONTROL OF REFRIGERATION CONTAINER AND REFRIGERATION CONTAINER CONNECTION SOCKET BOX

(71) Applicant: KUKDONG ELECOM CO., LTD, Busan (KR)

(72) Inventors: Jong Ki Lee, Busan (KR); Swann Jung, Busan (KR); Chan Yong Park, Busan (KR); Jung Gyu Lee, Busan (KR); Chul Ho Kim, Busan (KR); Soseul Kim, Busan (KR); Ki Hoon Nam, Busan (KR)

(73) Assignee: KUKDONG ELECOM CO., LTD., Busan (KR)

( * ) Notice: Subject to any disclaimer, the term of this patent is extended or adjusted under 35 U.S.C. 154(b) by 407 days.

(21) Appl. No.: 14/779,098

(22) PCT Filed: Mar. 20, 2014

(86) PCT No.: PCT/KR2014/002330
§ 371 (c)(1),
(2) Date: Sep. 22, 2015

(87) PCT Pub. No.: WO2014/148827
PCT Pub. Date: Sep. 25, 2014

(65) Prior Publication Data
US 2016/0047583 A1   Feb. 18, 2016

(30) Foreign Application Priority Data
Mar. 22, 2013  (KR) .................. 10-2013-0031069

(51) Int. Cl.
F25B 49/00  (2006.01)
F25D 29/00  (2006.01)
G06Q 10/06  (2012.01)

(52) U.S. Cl.
CPC .............. F25B 49/00 (2013.01); F25D 29/00 (2013.01); G06Q 10/06 (2013.01); *F25D 2400/40* (2013.01)

(58) Field of Classification Search
CPC ...... F25B 49/00; F25D 2400/40; F25D 29/00; G06Q 10/06
See application file for complete search history.

(56) References Cited

U.S. PATENT DOCUMENTS 5,387,994 A * 2/1995 McCormack ...... H04B 10/1143
398/117
7,427,918 B2 * 9/2008 Fano ..................... G08B 25/10
235/385

(Continued)

FOREIGN PATENT DOCUMENTS

KR   10-2005-0109603   11/2005
KR   10-2011-0086585   7/2011
KR   10-2012-0125841   11/2012

*Primary Examiner* — Kun Kai Ma
(74) *Attorney, Agent, or Firm* — John K. Park; Park Law Firm

(57) ABSTRACT

The invention relates to a monitoring system with control of a refrigeration container and a refrigeration container connection socket box. A connection cable is connected to the compatible plug-in port commonly formed in refrigeration containers. The connection socket box connecting connection cables is used to collect the state information of each refrigeration container transferred to a management server, so that a monitoring system applicable to all kinds of refrigeration container is provided, and can transfer a control signal for the refrigeration container through the compatible plug-in port, thus making it possible to remotely control the refrigeration container. Hence the system is simplified so as to reduce the cost and improve the stability of the system. The function of monitoring the state information and the function of measuring the power consumption of the refrig- (Continued)

eration container are also provided so as to reasonably calculate the cost of the actual power consumption.

3 Claims, 4 Drawing Sheets

(56) References Cited

U.S. PATENT DOCUMENTS

| | | | |
|---|---|---|---|
| 7,978,065 B2 * | 7/2011 | Schnitz | G06Q 10/08 340/426.19 |
| 9,142,107 B2 * | 9/2015 | Stevens | G08B 13/02 |
| 9,501,920 B2 * | 11/2016 | Harring | G08B 21/18 |
| 2005/0248454 A1 * | 11/2005 | Hanson | G06Q 10/087 340/539.26 |
| 2005/0248456 A1 * | 11/2005 | Britton, Jr. | G06Q 10/08 340/539.29 |
| 2006/0164239 A1 * | 7/2006 | Loda | G06K 19/07327 340/539.22 |
| 2007/0216542 A1 * | 9/2007 | Brosius | G06Q 10/08 340/989 |
| 2008/0228514 A1 * | 9/2008 | Robinson | G06Q 10/08 705/1.1 |
| 2009/0237258 A1 * | 9/2009 | Heck | H04Q 9/00 340/585 |
| 2010/0127867 A1 * | 5/2010 | Chien | B60C 23/009 340/545.6 |
| 2011/0156877 A1 * | 6/2011 | Wong | F25D 29/003 340/10.1 |
| 2011/0221573 A1 * | 9/2011 | Huat | G06Q 10/00 340/10.1 |
| 2011/0263205 A1 * | 10/2011 | Hoerdum | G06F 8/65 455/41.2 |
| 2013/0312450 A1 * | 11/2013 | Iwasa | F25D 11/003 62/440 |
| 2015/0112542 A1 * | 4/2015 | Fuglewicz | G07C 5/0858 701/32.2 |
| 2017/0184343 A1 * | 6/2017 | Freer | F25D 11/003 |

* cited by examiner

[Fig.1]
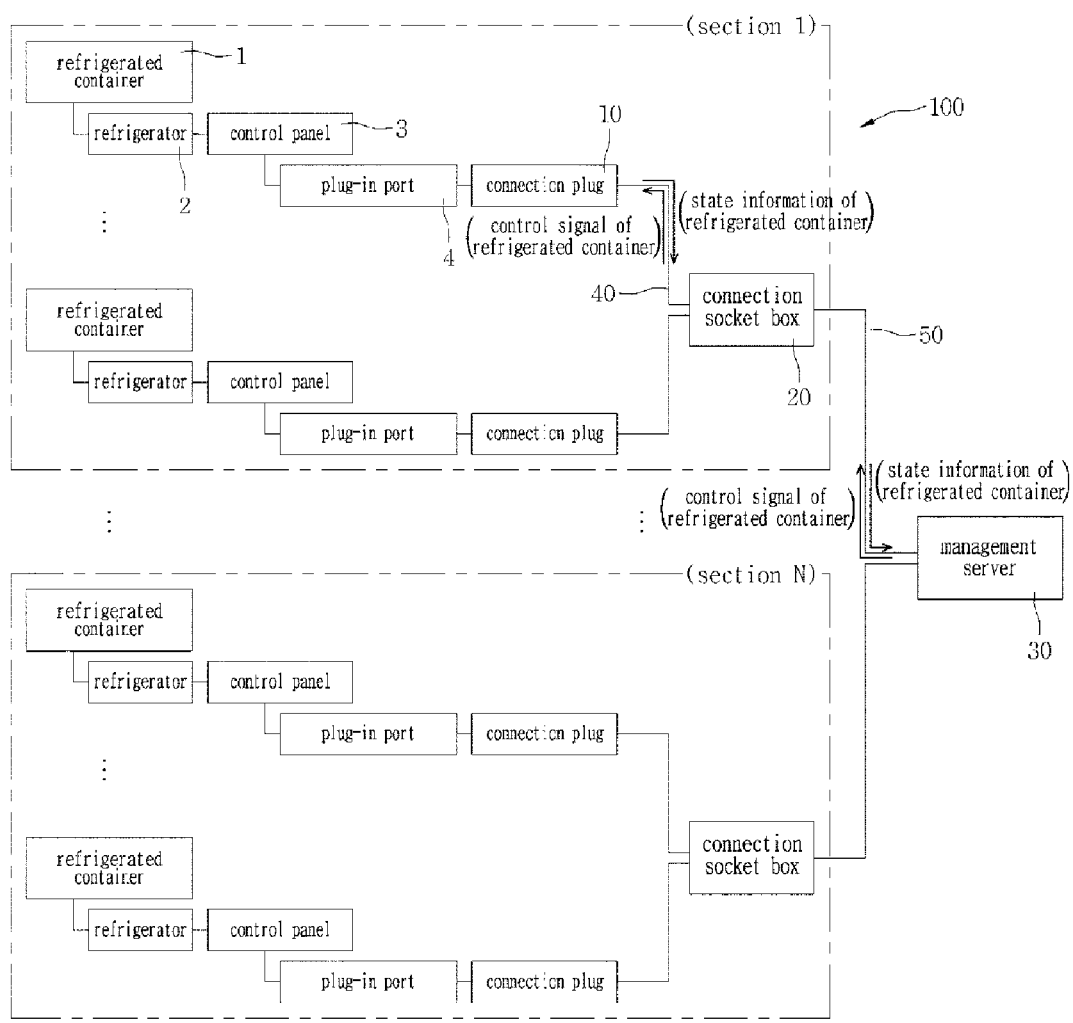

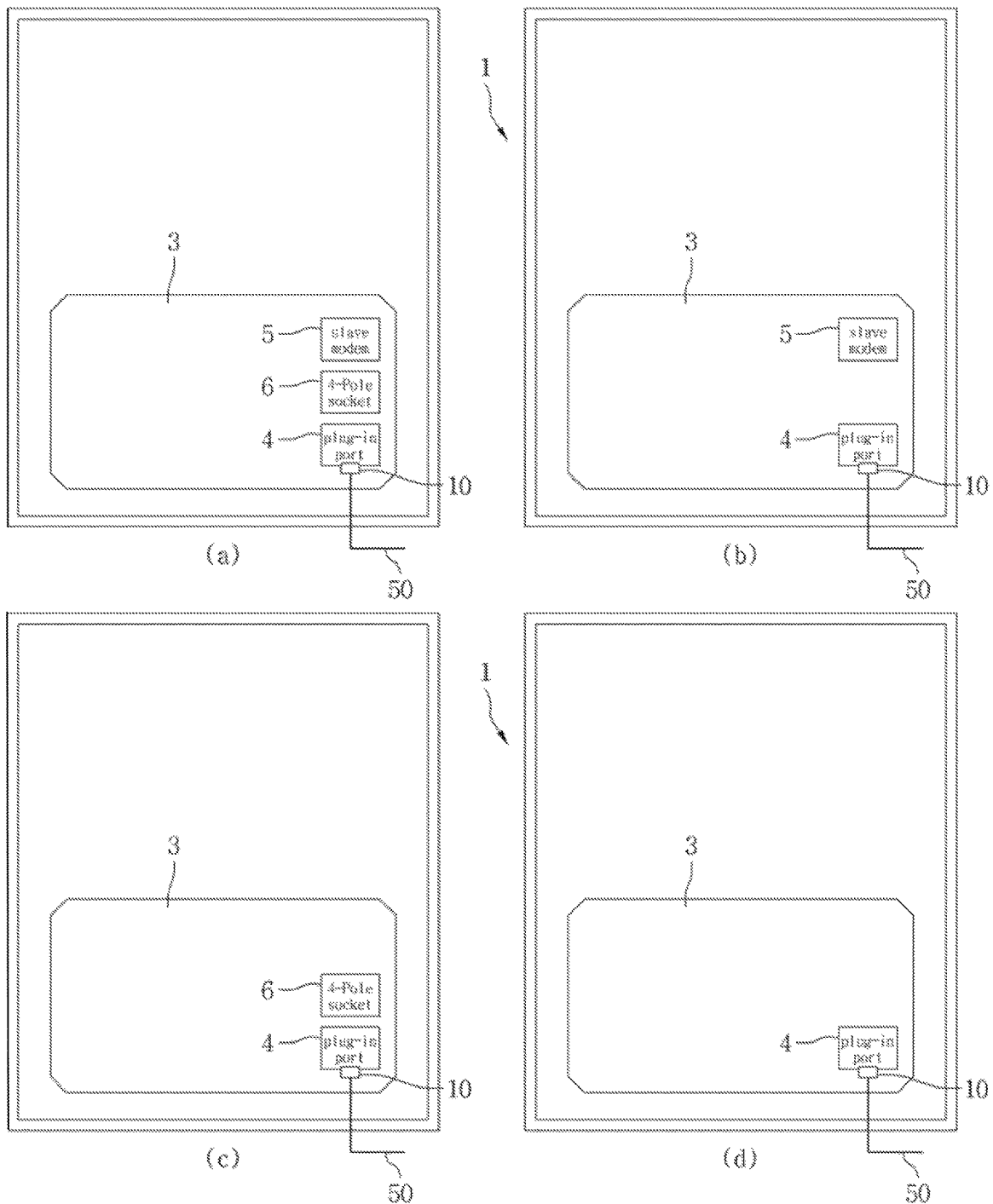
[Fig. 2]

[Fig.3]
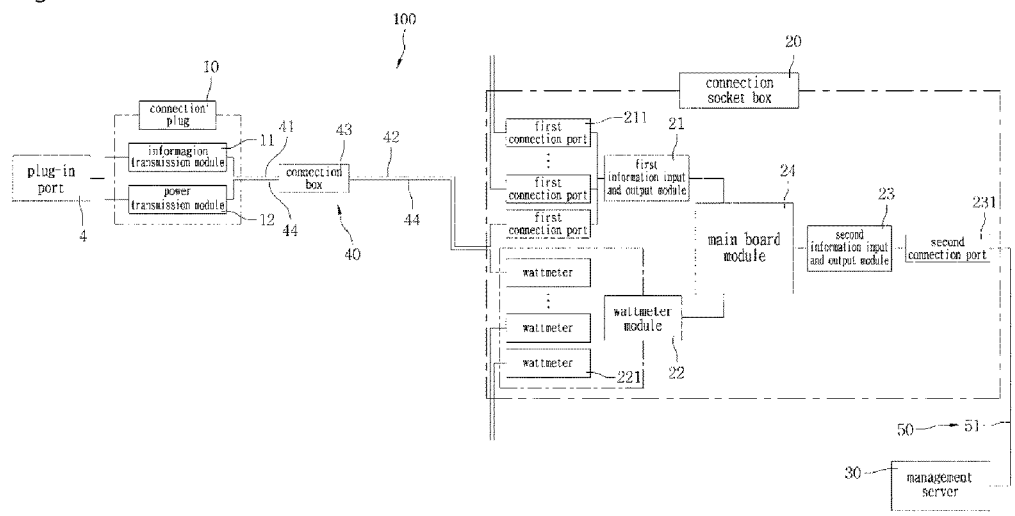
[Fig.4]
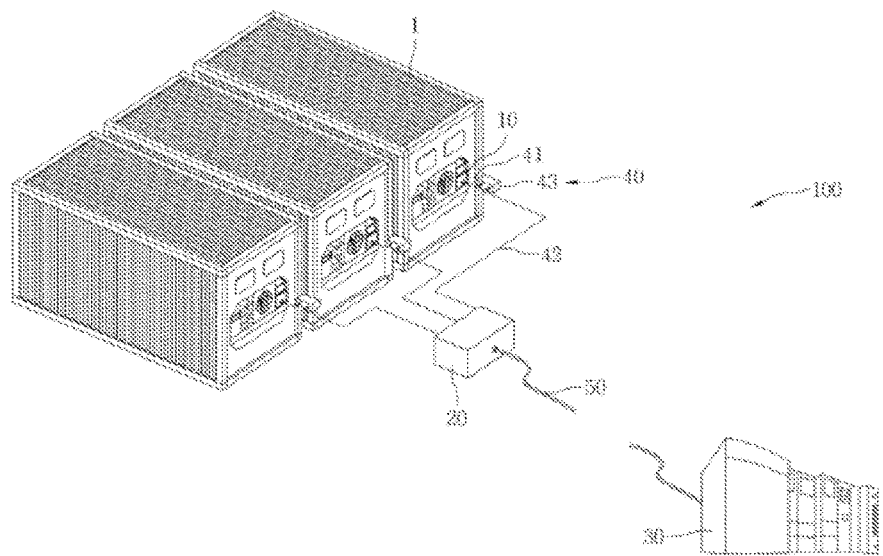

[Fig.5]
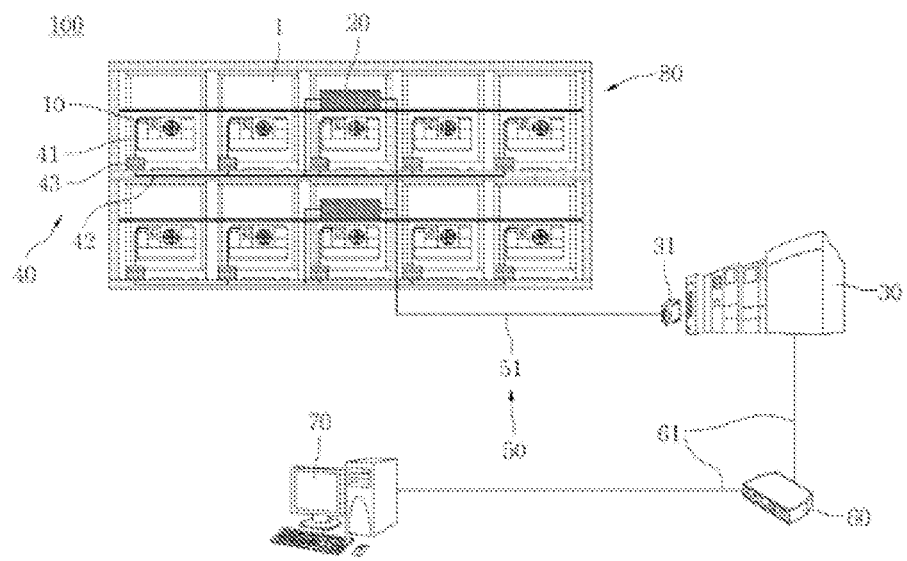
[Fig.6]
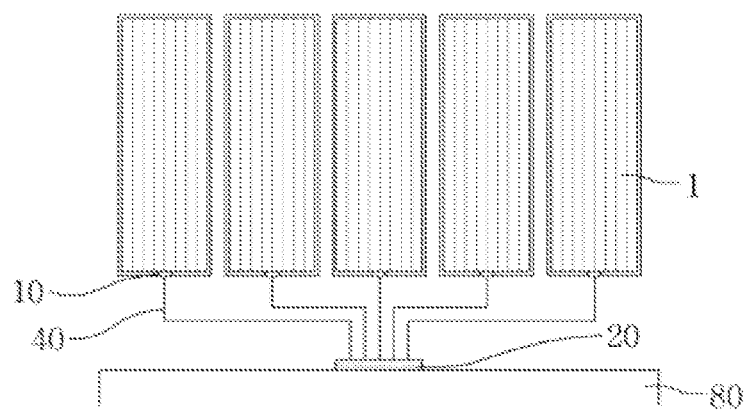

MONITORING SYSTEM WITH CONTROL OF REFRIGERATION CONTAINER AND REFRIGERATION CONTAINER CONNECTION SOCKET BOX

TECHNICAL FIELD

The present invention relates to a system for controlling and monitoring a refrigerated container and a connection socket box for the refrigerated container therefor, and more particularly, to such a system for controlling and monitoring a refrigerated container and a connection socket box for the refrigerated container therefor, in which a connection cable is connected to a general purpose plug-in port formed at various kinds of refrigerated containers, information regarding the state of each refrigerated container, which is collected through the connection socket box to which a plurality of connection cables are connected, is transmitted to a management server so that a system can be provided which can be universally applied to all the refrigerated containers irrespective of the kinds of the refrigerated container and simultaneously a control signal of the refrigerated container can be transmitted through the general purpose plug-in port to enable remote control of the refrigerated container and so that the facility construction cost can be reduced through a simplified configuration of the system, the stability of the system can be improved, and in which a function of measuring the amount of power consumed of the refrigerated container can be provided along with a function of monitoring the state information of the refrigerated container so that a power consumption cost corresponding to the actual amount of power consumed can be calculated reasonably.

BACKGROUND ART

A reefer or refrigerated container includes a refrigerator or freezer for adjusting the internal temperature thereof to transport farm, livestock, and fishery products requiring the maintenance of freshness, or chemical products or pharmaceutical products requiring chemical stability.

In order to store the farm, livestock, and fishery products, the chemical products, the pharmaceutical products, or the like in safe custody while maintaining their qualities within the refrigerated container, the inside of the refrigerated container is required to be maintained continuously in a preset state. Thus, it is required that the internal state of the refrigerated container should be monitored and the refrigerated container should be controlled depending on information regarding the monitored internal state.

To this end, a refrigerated container monitoring system can be provided at a means of transport such as a trailer, a ship, or an aircraft which is moved with refrigerated containers loaded thereon, or a container yard where the refrigerated containers are piled up on top of one another in the movement process of the refrigerated container As examples of a technology related to such a refrigerated container monitoring system, there are disclosed Korean Patent Registration No. 10-0972128 entitled "Refrigerated Container Communication Device and Refrigerated Container Monitoring System and Method Using The Same" and Korean Patent Laid-Open Publication No. 10-2006-0090884 entitled "Refrigerated Container Monitoring System Using Wireless Modem and Control method Thereof".

The above patent document, the refrigerated container monitoring system disclosed in Korean Patent Registration No. 10-0972128 includes: an active tag installed at a refrigerated container, the active tag being configured to be initialized and having stored therein a unique number of the refrigerated container, which is transferred thereto, and configured to read and output information regarding the operating state of the refrigerated container monitoring system; a smart reader configured to receive the information regarding the operating state of the refrigerated container monitoring system from the active tag through wireless communication; and output the received the information regarding the operating state of the refrigerated container monitoring system; and a server configured to receive the information regarding the operating state of the refrigerated container monitoring system from the smart reader through wired communication and process the received information, the server being configured to assign the unique number. The refrigerated container monitoring system has an advantage in that it can manage a 4-pole type refrigerated container in an easy and efficient manner, and can acquire information regarding a corresponding position through the unique number assigned to the active tag, a unique ID of the smart reader and the like so that a corresponding refrigerated container can be found easily.

In the refrigerated container monitoring system disclosed in disclosed in Korean Patent Registration No. 10-0972128, a 4-pole socket that can be formed at a control panel for controlling a refrigerator of the refrigerated container is used as a communication port for monitoring the refrigerated container. A 4-pole socket cable is connected to the 4-pole socket of the refrigerated container, and the 4-pole socket cable connected to a plurality of refrigerated containers is connected to a reefer container socket (RCS) box having a built-in remote monitoring unit (RMU). The RCS box is configured to be connected to a master modem by means of power line communication so that information regarding the state of the plurality of refrigerated containers is transferred to a management server through the master modem.

However, the refrigerated container monitoring system based on the 4-pole socket entails a problem in that it is possible to monitor the refrigerated container but it is impossible to remotely control the operation of the refrigerated container according to a result of the monitoring, and in that since there frequently occurs the case where the 4-pole socket is not provided depending on the kind or the manufacture company of the refrigerated container, the refrigerated container monitoring system cannot be universally applied to the refrigerated container.

The refrigerated container monitoring system disclosed in Korean Patent Laid-Open Publication No. 10-2006-0090884 is a system that includes a plurality of refrigerated container each having a download port through which information can be transmitted to the outside. The refrigerated container monitoring system includes: one or more wireless slave terminals each connected to a download port of each refrigerated container and configured to convert the operation information of the refrigerated container into a wireless signal and transmit the converted operation information through the download port; and a central control server configure to receive the wireless signal from each wireless slave terminal to collect the operation information of the refrigerated container and monitor each refrigerated container, process the collected operation information of the refrigerated container and display the processed operation information to a manager, and give an alarm to the manager if abnormal information is detected from a specific refrigerated container.

However, the refrigerated container monitoring system disclosed in Korean Patent Laid-Open Publication No. 10-2006-0090884 encounters a problem in that the wireless communication is used and thus instability of the refrigerated container monitoring system is increased by signal interference or noise.

Meanwhile, a system has been developed and used which monitors a refrigerated container based on the power line communication through a slave modem that can be formed at the control panel of the refrigerated container. Such a power line communication type refrigerated container monitoring system is configured such that a power line is connected to the slave modem of the refrigerated container, the power line connected to a plurality of refrigerated containers is connected to a reefer container socket (RCS) box having a built-in a remote monitoring unit (RMU), and the RCS box is connected to a master modem by means of power line communication so that information regarding the state of the plurality of refrigerated containers is transferred to a management server through the master modem.

Such a power line communication type refrigerated container monitoring system still has a problem in that it is possible to monitor the refrigerated container and remotely control the operation of the refrigerated container according to a result of the monitoring, but there frequently occurs the case where the slave modem is not provided depending on the kind or the manufacture company of the refrigerated container, thus the refrigerated container monitoring system cannot be universally applied to the refrigerated container. Accordingly, a refrigerated container which is not monitored by the power line communication type refrigerated container monitoring system causes a worker to suffer from an inconvenience of having to monitor personally in a field, and the installation of the slave modem and the master modem leads to an increase in the installation cost.

In the meantime, the conventional refrigerated container monitoring system has a disadvantage in that since the amount of power consumed is not measured, power consumption cost can be arbitrarily assigned by an owner or a manager of a space where the refrigerated container monitoring system is constructed, which may cause an unreasonable situation.

DISCLOSURE OF INVENTION

Technical Problem

Accordingly, the present invention has been made to solve the above-mentioned problems occurring in the prior art, and it is an object of the present invention to provide a novel system for controlling and monitoring a refrigerated container and a connection socket box for the refrigerated container therefor, in which a general purpose plug-in port installed commonly installed at a control panel of various kinds of refrigerated containers, but not a slave modem or a 4-pole socket is used as a communication port for monitoring the refrigerated container and remotely controlling the operation of the refrigerated container so that the system can be universally applied to all the refrigerated containers irrespective of the kind of the refrigerated container to perform a function of monitoring the refrigerated container and remotely controlling the operation of the refrigerated container, and the information regarding the state of each refrigerated container, which is integrally collected through the connection socket box to which a plurality of connection cables such as the RS232 communication line and the RS485 communication line are connected, is transmitted to the management server through the communication cable. In the meantime, the refrigerated container control signal of the management server is transmitted to each refrigerated container through the connection socket box, thereby promoting simplification of the system, and thus reducing the facility construction cost, and improving the stability of the system.

Another object of the present invention is to provide a novel system for controlling and monitoring a refrigerated container and a connection socket box for the refrigerated container therefor, in which the power line of the connection cable connected to the general purpose plug-in port is connected to a plurality of wattmeters capable of being installed at the connection socket box to measure the amount of power consumed of the refrigerated container so that a power consumption cost corresponding to the actual amount of power consumed can be calculated, and thus reasonable cost spending can be expected

Technical Solution

To achieve the above objects, in one aspect, the present invention provides a system for controlling and monitoring a refrigerated container, comprising: one or more connection plugs, each of which is connected to a plug-in port of a control panel of each of a plurality of refrigerated containers, and configured to receive information regarding the state of each refrigerated container from the plug-in port and transmit a control signal of the refrigerated container to the plug-in port; one or more connection socket boxes, each of which is connected to a set number of connection plugs through a connection cable, and configured to receive the information regarding the state of the refrigerated container and transmit the control signal of the refrigerated container to each of the connection plugs; and a management server connected to the connection socket box through a communication cable, the management server being configured to receive the information regarding the state of the refrigerated container and monitor the received state information, and generate the control signal of the refrigerated container for transmission to the connection socket box.

In another aspect, the present invention provides a connection socket box for a refrigerated container, including: a first information input and output module including a plurality of first connection ports to which a communication line of a connection cable connected to a plug-in port commonly formed at a control panel of the refrigerated container is connected, the first information input and output module being configured to receive information regarding the state of each refrigerated container from a plurality of refrigerated containers and transmit a control signal of the refrigerated container to each refrigerated container; a wattmeter module including a plurality of wattmeters to which a power line of the connection cable connected to the plug-in port commonly formed at the control panel of the refrigerated container is connected and configured to measure the amount of power consumed of each of the plurality of refrigerated containers; a second information input and output module including a second connection port to which a communication cable connected to a management server for monitoring and controlling the refrigerated containers is connected, the second information input and output module being configured to transmit the information regarding the state of the refrigerated containers to the management server and receive the control signal of the refrigerated container from the management server; and a main board module configured to allow the first information input and output module, the wattmeter module, and the second information input and output module to be connected to one another and controlled.

Advantageous Effects

The system for controlling and monitoring a refrigerated container and a connection socket box for the refrigerated container therefor according to the embodiments of the present invention as constructed above have the following advantageous effects.

The communication cable such as the RS232 communication line 41 and the RS485 communication line is connected to the general purpose plug-in port commonly formed at the control panel of various kinds of refrigerated containers to perform a function of monitoring the refrigerated container and remotely controlling the operation of the refrigerated container so that the system and the connection socket box can be universally applied to all the refrigerated containers irrespective of the kind of the refrigerated container, thereby increasing utility, adaptability, and scalability of the monitoring system. In addition, the information regarding the state of each refrigerated container, which is integrally collected through the connection socket box to which a plurality of connection cables are connected, is transmitted to the management server through the communication cable. In the meantime, the refrigerated container control signal of the management server is transmitted to each refrigerated container through the connection socket box, thereby promoting simplification of the system, and thus reducing the facility construction cost, and improving the stability of the system.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a block diagram illustrating a basic configuration of a system for controlling and monitoring a refrigerated container according to the present invention;

FIGS. 2(a) to 2(d) are views illustrating application of a system for controlling and monitoring a refrigerated container according to the present invention to plug-in ports of various kinds refrigerated containers;

FIG. 3 is a block diagram illustrating a detailed configuration of a system for controlling and monitoring a refrigerated container according to an embodiment of the present invention;

FIG. 4 is a diagrammatic view illustrating a connection figuration of a system for controlling and monitoring a refrigerated container according to an embodiment of the present invention; and FIGS. 5 and 6 are diagrammatic views illustrating an arrangement configuration of connection socket box for the refrigerated container according to an embodiment of the present invention.

BEST MODE FOR CARRYING OUT THE INVENTION

Now, preferred embodiments of the present invention will be described hereinafter in detail with reference to FIGS. 1 to 6. In the meantime, in the detailed description and the accompanying drawings, illustration and explanation on the construction and operation which a person skilled in the art can easily understand from a general refrigerated container, a refrigerator, a control panel, a plug-in port, a wattmeter, RS232 communication, RS485 communication, optical communication, and a refrigerated container monitoring system will be briefly made or will be omitted to avoid redundancy. In particular, in the detailed description and the accompanying drawings, illustration and explanation on the detailed technical construction and operation of elements, which have no direct connection with the technical features of the present invention, will be omitted, and only the technical constructions directly related with the present invention will be briefly illustrated and explained.

A system for controlling and monitoring a refrigerated container 100 includes a plurality of connection plugs 10, a plurality of connection socket boxes 20, and a management server 30. The system 100 for controlling and monitoring a refrigerated container is characterized in that it simultaneously performs a function of monitoring a refrigerated container 1 and a function of remotely controlling the operation of refrigerated container 1. In other words, the system 100 for controlling and monitoring a refrigerated container according to an embodiment of the present invention is a system for monitoring the internal state of the refrigerated container 1 including a refrigerator 2 in real-time and remotely controlling the operation of the refrigerated container 1.

The system 100 for controlling and monitoring a refrigerated container according to an embodiment of the present invention can be applied to a ship or an aircraft which is moved with a plurality of refrigerated containers 1 loaded thereon, or a container yard where the plurality of refrigerated containers 1 are piled up on top of one another. As shown in FIG. 1, a space where a plurality of refrigerated containers 1 is disposed is divided into a plurality of sections (i.e., section 1, section 2, . . . , and section N) so that a connection socket box 20 is allocated and operated by each section where a set number of refrigerated containers 1 are disposed.

In particular, the system 100 for controlling and monitoring a refrigerated container according to an embodiment of the present invention is characterized in that it utilizes a general purpose plug-in port 4 commonly included in a control panel 3 irrespective of the kind or the manufacture company of the refrigerated container 1. Thus, the system 100 for controlling and monitoring a refrigerated container can be universally applied to various kinds of refrigerated containers 1. In other words, the system 100 for controlling and monitoring a refrigerated container may be applied to a refrigerated container 1 including a slave modem 5, a 4-pole socket 6, and a plug-in port 4 as shown in FIG. 2(a), a refrigerated container 1 including a slave modem 5 and a plug-in port 4 as shown in FIG. 2(b), a refrigerated container 1 including a 4-pole socket 6 and a plug-in port 4 as shown in FIG. 2(c), and a refrigerated container 1 including a plug-in port 4 only as shown in FIG. 2(d).

The connection plug 10 is connected to a plug-in port 4 of a control panel 3 of each of a plurality of refrigerated containers 1. The connection plug 10 receives information regarding the state of each refrigerated container, which is collected on the control panel 3, from the plug-in port 4 for transmission to the plug-in port 4, and receives a control signal of the refrigerated container from the connection socket box 20 for transmission to the plug-in port 4. Herein, the connection plug 10 according to an embodiment of the present invention includes an information transmission module 11 and a power transmission module 12 as shown in FIG. 3. The information transmission module 11 is connected to the plug-in port 4 to receive the information regarding the state of the refrigerated container and transmit the control signal of the refrigerated container to the plug-in port. The information transmission module 11 is connected to a communication line. The power transmission module 12 is connected to the plug-in port 4 to receive a current driving power of the refrigerated container. The power transmission module 12 is connected to a power line. The information transmission module 11 and the power transmission module 12 may be implemented in the connection plug 10 in the form of an electrical and electronic circuit.

The connection socket box 20 is connected to a set number of connection plugs 10 through a connection cable 40 to receive the information regarding the state of the refrigerated container and transmit the control signal of the refrigerated container, which is applied thereto from a management server 30, to each of the connection plugs 10.

Herein, the connection cable 40 that interconnects the connection plug 10 and the connection socket box 20 may include an RS232 communication line 41 connected to the plug-in port 4, an RS485 communication line 42 connected to the connection socket box 20, and a connection box 43 installed between the RS232 communication line 41 and the RS485 communication line 42 to interconnect the RS232 communication line 41 and the RS485 communication line 42 as shown in FIGS. 3 and 4. The connection cable 40 is configured such that the RS485 communication line 42 which is formed relatively lengthily is applied to the RS232 communication line 41 which is formed relatively shortly in response to an increase in the distance between the connection plug 10 connected to the refrigerated container and the connection socket box 20. Of course, the connection cable 40 is not limited to the RS232 communication line 41 and the RS485 communication line 42, but a communication line according to various communication standards may be applied thereto.

In the meantime, the connection cable 40 according to an embodiment of the present invention consists of a communication line and a power line 44 which are in parallel connected to the information transmission module 11 and the power transmission module 12 independently. The communication line may consist of the RS232 communication line 41 and the RS485 communication line 42 as described above. In addition, the power line 44 may be formed in such a manner as to form a single cable together with the RS232 communication line 41 or the RS485 communication line 42.

Herein, the connection socket box 20 for the refrigerated container according to an embodiment of the present invention includes a first information input and output module 21, a wattmeter module 22, a second information input and output module 23, and a main board module 24 as shown in FIG. 3.

The first information input and output module 21 includes a plurality of first connection ports 211 to which the communication line of the connection cable 40 connected to the plug-in port 4 commonly formed at the control panel 3 of the refrigerated container 1 is connected to receive the information regarding the state of each of the plurality of refrigerated containers 1 and transmit the control signal of the refrigerated container, which is applied thereto from the management server 30, to each refrigerated container.

The wattmeter module 22 includes a plurality of wattmeters 221 to which the power line of the connection cable 40 connected to the plug-in port 4 commonly formed at the control panel 3 of the refrigerated container 1 is connected to measure the amount of power consumed of each of the plurality of refrigerated containers 1. The wattmeter 221 is installed so as to be exposed to the outside so that a manager or a worker can identify the amount of power consumed, which is displayed on the wattmeter 221. In addition, the wattmeter module 22 is connected to the main board module 24 so that information regarding the amount of power consumed of each of the plurality of refrigerated containers 1 can be transmitted to the management server 30. In the meantime, it is to be noted, of course, that the connection socket box 20 is not provided with the wattmeter module 22 and a separate wattmeter module 22 can be installed independently of the connection socket box 20.

The second information input and output module 23 includes a second connection port 231 to which a communication cable 50 connected to the management server 30 for monitoring and controlling the refrigerated containers 1 is connected to transmit the information regarding the state of the refrigerated containers to the management server 30 and receive the control signal of the refrigerated container from the management server 30.

The management server 30 is connected to the connection socket box 20 through the communication cable 50 to receive the information regarding the state of the refrigerated container and monitor the received state information. The management server 30 generates the control signal of the refrigerated container for transmission to the connection socket box 20.

Herein, an optical communication cable 51 may be used as the communication cable 50 that interconnects the management server 30 and the connection socket box 20. The management server 30 includes an optical communication modem 31 to allow the optical communication cable 51 to be connected to the optical communication modem 31 as shown in FIG. 5.

In the meantime, the system 100 for controlling and monitoring a refrigerated container according to an embodiment of the present invention may include a frame 80 for installing the connection socket box, which is fixed to the connection socket box 20 and is formed with a frame having a shape corresponding to the refrigerated containers 1 so that the refrigerated containers 1 can be effectively applied to a ship, an aircraft or a container yard with them loaded in multiple stages while forming a plurality of rows and columns as shown in FIGS. 5 and 6. The connection box 43 constituting the connection cable 40 can be fixed to the connection socket box installing frame 80. The installation of the connection socket box 20 constituting the system 100 for controlling and monitoring a refrigerated container through the connection socket box installing frame 80, and the wiring of the connection cable 40 and the communication cable 50 can be performed stably and smoothly.

In addition, the system 100 for controlling and monitoring a refrigerated container according to an embodiment of the present invention enables the information regarding the state of the refrigerated container, which is stored in the management server 30, to be identified, or the control signal of the refrigerated container to be applied to the management server 30 through a personal computer 70 that communicates with the management server 30 via an LAN cable 61 connected to a network hub 61 connected to the management server 30.

The system for controlling and monitoring a refrigerated container and the connection socket box for the refrigerated container therefor according to an embodiment of the present invention as described above enables the communication cable 40 such as the RS232 communication line 41 and the RS485 communication line 42 to be connected to the general purpose plug-in port 4 commonly formed at the control panel 3 of various kinds of refrigerated containers 1 to perform a function of monitoring the refrigerated container land remotely controlling the operation of the refrigerated container 1 so that the system and the connection socket box can be universally applied to all the refrigerated containers irrespective of the kind of the refrigerated container 1, thereby increasing utility, adaptability, and scalability of the monitoring system. Further, in the system for controlling and monitoring a refrigerated container and the connection socket box for the refrigerated container therefor according to an embodiment of the present invention, the information regarding the state of each refrigerated container, which is collected through a plurality of connection socket boxes 20 that are connected to one another, is transmitted to the management server 30 through the communication cable 51. In the meantime, the refrigerated container control signal of the management server 30 is transmitted to each refrigerated container 1 through the connection socket box 20 so that simplification of the system is promoted, and thus the facility construction cost is reduced, and the stability of the system is improved.

In addition, in the system for controlling and monitoring a refrigerated container and the connection socket box for the refrigerated container therefor according to an embodiment of the present invention, the power line 44 of the connection cable 40 connected to the general purpose plug-in port 4 is connected to a plurality of wattmeters 221 to measure the amount of power consumed of the refrigerated container 1 so that a power consumption cost corresponding to the actual amount of power consumed can be calculated reasonably, thus leading to solving the complaint or conflict associated with the cost at a field of the logistics industry.

While the system for controlling and monitoring a refrigerated container and the connection socket box for the refrigerated container therefor according to the preferred embodiments of the present invention has been described and illustrated in connection with specific exemplary embodiments with reference to the accompanying drawings, it will be readily appreciated by those skilled in the art that it is merely illustrative of the preferred embodiments of the present invention and various modifications and changes can be made thereto within the technical spirit and scope of the present invention. (4:00)

Mode for the Invention

The present invention provides a system for controlling and monitoring a refrigerated container, including: one or more connection plugs, each of which is connected to a plug-in port of a control panel of each of a plurality of refrigerated containers, and configured to receive information regarding the state of each refrigerated container from the plug-in port and transmit a control signal of the refrigerated container to the plug-in port; one or more connection socket boxes, each of which is connected to a set number of connection plugs through a connection cable, and configured to receive the information regarding the state of the refrigerated container and transmit the control signal of the refrigerated container to each of the connection plugs; and a management server connected to the connection socket box through a communication cable, the management server being configured to receive the information regarding the state of the refrigerated container and monitor the received state information, and generate the control signal of the refrigerated container for transmission to the connection socket box. The connection cable may include an RS232 communication line connected to the plug-in port, an RS485 communication line connected to the connection socket box, and a connection box installed between the RS232 communication line and the RS485 communication line and configured to interconnect the RS232 communication line and the RS485 communication line. The communication cable may be implemented as an optical communication cable.

In addition, the connection plug may include: an information transmission module connected to the plug-in port and configured to receive the information regarding the state of the refrigerated container and transmit the control signal of the refrigerated container to the plug-in port receive; and a power transmission module connected to the plug-in port and configured to a current driving power of the refrigerated container. The connection cable may include a communication line and a power line which are in parallel connected to the information transmission module and the power transmission module independently, and the connection socket box may further include a wattmeter connected to the power line of the connection cable and configured to measure the amount of power consumed of the refrigerated container.

Herein, the connection socket box may include: a first information input and output module including one or more first connection ports to which the communication line of the connection cable is connected, the first information input and output module being configured to receive information regarding the state of the refrigerated container from each refrigerated container and transmit the control signal of the refrigerated container to each refrigerated container; a wattmeter module including a plurality of wattmeters; and a second information input and output module including a second connection port to which the communication cable is connected, the second information input and output module being configured to transmit the information regarding the state of the refrigerated containers to the management server and receive the control signal of the refrigerated container from the management server.

Meanwhile, the present invention provides a connection socket box for a refrigerated container, including: a first information input and output module including a plurality of first connection ports to which a communication line of a connection cable connected to a plug-in port commonly formed at a control panel of the refrigerated container is connected, the first information input and output module being configured to receive information regarding the state of each refrigerated container from a plurality of refrigerated containers and transmit a control signal of the refrigerated container to each refrigerated container; a wattmeter module including a plurality of wattmeters to which a power line of the connection cable connected to the plug-in port commonly formed at the control panel of the refrigerated container is connected and configured to measure the amount of power consumed of each of the plurality of refrigerated containers; a second information input and output module including a second connection port to which a communication cable connected to a management server for monitoring and controlling the refrigerated containers is connected, the second information input and output module being configured to transmit the information regarding the state of the refrigerated containers to the management server and receive the control signal of the refrigerated container from the management server; and a main board module configured to allow the first information input and output module, the wattmeter module, and the second information input and output module to be connected to one another and controlled.

INDUSTRIAL APPLICABILITY

According to the system for controlling and monitoring a refrigerated container and the connection socket box for the refrigerated container therefor of the present invention, the power line of the connection cable connected to the general purpose plug-in port is connected to a plurality of wattmeters to measure the amount of power consumed of the refrigerated container so that a power consumption cost corresponding to the actual amount of power consumed can be calculated reasonably, thus leading to solving the complaint or conflict associated with the cost at a field of the logistics industry.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

The invention claimed is:

1. A system for controlling and monitoring a plurality of refrigerated containers, comprising:
    one or more connection plugs, each of which is connected to a plug-in port of a control panel of each of the plurality of refrigerated containers, and configured to receive information regarding a state of each of the plurality of refrigerated containers from the plug-in port and transmit a control signal of each of the plurality of the refrigerated containers to the plug-in port;
    one or more connection socket boxes, each of which is connected to the one or more connection plugs through a connection cable, and configured to receive the information regarding the state of each of the plurality of refrigerated containers and transmit the control signal of the refrigerated container to each of the one or more connection plugs; and
    a management server connected to the one or more connection socket boxes through a communication cable, the management server being configured to receive the information regarding the state of each of the plurality of refrigerated containers and monitor the received state information, and generate the control signal of each of the plurality of refrigerated containers for transmission to the one or more connection socket boxes,
    wherein the connection plug comprises: an information transmission module connected to the plug-in port and configured to receive the information regarding the state of each of the plurality of refrigerated containers and transmit the control signal of each of the plurality of the refrigerated containers to the plug-in port; and a power transmission module connected to the plug-in port and configured to receive a current driving power of each of the plurality of the refrigerated containers,
    wherein the connection cable comprises a communication line and a power line which are in parallel connected to the information transmission module and the power transmission module independently, and
    wherein the connection socket box further comprises the wattmeter connected to the power line of the connection cable and configured to measure the amount of power consumed of the plurality of the refrigerated containers.

2. The system according to claim 1, wherein the connection cable comprises an RS232 communication line connected to the plug-in port, an RS485 communication line connected to the one or more connection socket boxes, and a connection box installed between the RS232 communication line and the RS485 communication line and configured to interconnect the RS232 communication line and the RS485 communication line, and
    wherein the communication cable is implemented as an optical communication cable.

3. The system according to claim 1, wherein the connection socket box comprises:
    a first information input and output module including one or more first connection ports to which the communication line of the connection cable is connected, the first information input and output module being configured to receive information regarding the state of the refrigerated container from each of the plurality of the refrigerated containers and transmit the control signal of the refrigerated container to each of the plurality of the refrigerated containers;
    the wattmeter module including a plurality of wattmeters; and
    a second information input and output module including a second connection port to which the communication cable is connected, the second information input and output module being configured to transmit the information regarding the state of the refrigerated containers to the management server and receive the control signal of the refrigerated container from the management server.

* * * * *